UNITED STATES PATENT OFFICE.

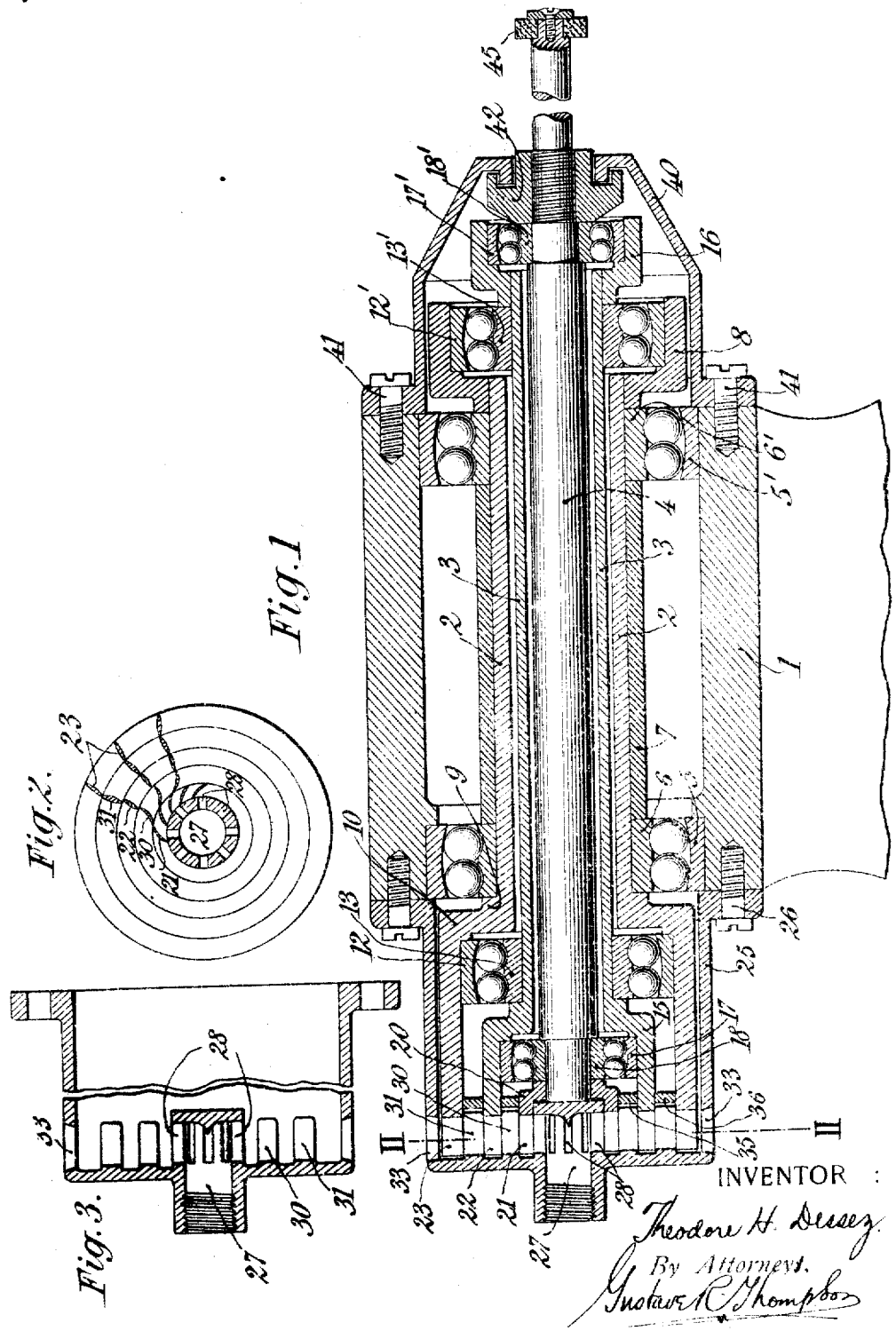

THEODORE H. DESSEZ, OF WEST HAVEN, CONNECTICUT.

HIGH-SPEED-SPINDLE MACHINE.

1,304,278. Specification of Letters Patent. Patented May 20, 1919.

Application filed October 17, 1917. Serial No. 197,097.

*To all whom it may concern:*

Be it known that I, THEODORE H. DESSEZ, a citizen of the United States of America, residing in West Haven, in the county of New Haven and State of Connecticut, have invented certain new and useful Improvements in High-Speed-Spindle Machines, of which the following is a specification.

This invention relates to improvements in high-speed spindle machines, such as internal grinders, and drilling machines employing small or wire-size drills, and aims to provide improvements therein.

In drilling machines employing very small size drills such as used in clock and watch manufacturing, it is necessary to turn the spindle carrying the drill at a high rate of rotation—as for example 50,000 to 60,000 revolutions per minute, in order to obtain the highest cutting efficiency of the drill. In grinders employing grind stones of very small diameter, it is also necessary to turn the spindle at a very high rate of rotation in order to obtain an efficient grinding action, which is at a surface speed of about a mile a minute.

In such high-speed spindle machines it is desirable to avoid excessive wear of the spindle bearings to obtain a very steady and true rotation of the spindle and to obtain an efficient driving arrangement.

The present invention provides a spindle machine in which the wear is reduced by employing a plurality of rotating spindles, one of which serves as a bearing for another and preferably driving one spindle with relation to another. By driving each spindle at the same relative speed (which may be comparatively low) a very high speed of the spindle carrying the working tool, *i. e.*, a multiple of the relative speed corresponding to the number of spindles, may be obtained, without the speed of any one spindle in its bearing being high. For example, in a three-spindle machine with each spindle given a relative speed of 20,000 rotations per minute, the spindle moving at the highest speed would have an actual speed of rotation of 60,000 rotations per minute.

The invention further provides such a multiple spindle machine wherein the spindles run truly, smoothly and steadily, and with minimum noise. The construction is also strong and compact.

The invention further provides a compressed fluid drive for the spindles, and provides for the driving of the spindles at different actual speeds and approximately equal relative speeds without the use of pulleys or gears, or the like.

Other features of improvement will be hereinafter set forth.

An embodiment of the invention is illustrated in the accompanying drawing.

In said drawing,—

Figure 1 is a vertical sectional view of the embodiment chosen for illustration;

Fig. 2 is a sectional view on the line II—II, Fig. 1;

Fig. 3 is a dovetail sectional view showing a part of the turbine driving means.

In said drawings, numeral 1 designates a suitable base or support in which is rotatably supported a hollow spindle 2. The hollow spindle may support another hollow spindle 3, and this latter spindle may support the tool-carrying spindle 4, as illustrated. This concentric arrangement of the spindles provides a very steady support for them and provides a very steady, true and smooth running device.

The spindles are preferably mounted in ball bearings, which are preferably of the self alining radial bearing type, as illustrated. To this end, bearing rings 5, 5' are fitted in the support and companion bearing rings 6, 6' are fitted on the spindle 2, between which rings are placed the balls. The bearing rings 6, 6' are spaced and held on the spindle 2 by a sleeve 7, a collar 8 and a shoulder 9 on the spindle. The spindle 2 is preferably provided with an enlargement 10 at one end and the collar 8 is provided with a similar enlargement to provide for the reception of the bearing rings 12, 12' of the bearing for the spindle 3. Companion bearing rings 13, 13' are fitted on the spindle 3. The spindle 3 is provided with an enlarged end 15, and with a collar 16 provided with a similar enlargement for the reception of the bearing rings 17, 17' of the bearings for the spindle 4. Companion bearing rings 18, 18' are mounted on the spindle 4.

The ends of the spindles 2 and 3 are preferably prolonged and the spindle 4 is provided with a collar 20, on which collar and prolongations of the hollow spindles are formed series of turbine blades 21, 22, 23.

Over the ends of the spindles provided with the blades there is preferably provided a cap or cover 25 which may be fixed to the support or casing 1 by means of screws 26. This cover is conveniently formed with a conduit or passage 27 for motive fluid, such as compressed air, and this conduit is provided with orifices or nozzles 28 for directing jets of compressed air into the blades 21 of the spindle 4. Projecting from the cap 25 is a series of fixed baffles 30 which direct the air jet onto the blades 22 of the spindle 3. Baffles 31 projecting from the cap 25 direct the jet onto the blades 23 on the spindle 2. The jet reaches the atmosphere through holes 33 in the cap 25.

The angle of the blades 21 connected to the tool-carrying spindle 4 is such as to receive maximum driving force from the air-jet, as the spindle 4 must be driven with a force to overcome the resistance of the tool carried by the shaft, as well as the friction of the bearings. The arrangement of the blades 22 and 23 on the spindles 2 and 3 is such that the jet strikes the blades at a slight angle of incidence. The air also undergoes considerable expansion as it projects radially, and the angle of the blades 22 and 23 and the degree of expansion of the air of the jet is so chosen that the force of the air on the blades will be sufficient to overcome the friction of the spindles 2 and 3 when turning at the relative speed desired,—say 20,000 rotations per minute. The force of the air on the blades 21 connected to the tool-spindle 1 is such that at working speed the spindle 1 will have approximately its desired relative speed of rotation.

35, 36 designate packing rings for excluding the air jet and dust from the bearings.

40 designates a dust cap which is preferably fitted over the bearings at the front end of the machine, and preferably screwed onto the casing 1, as indicated at 41. 42 designates a collar in the spindle 4 which fits closely with the cap 40 to exclude dust, etc.

The spindle 4 is shown fitted with a grinding wheel 45, but may be fitted with any other appropriate tool.

The concentric arrangement of the spindles with the tool-carrying spindle innermost is advantageous, as it permits of it having the longest bearing, i. e., the greatest relative distance between its supports, and hence improves the steadiness and trueness of the running.

The casing 1 provides a capacious reservoir for oil which keeps the bearings well lubricated and cooled, as the parts are constructed so that the casing may be nearly filled with oil.

In some cases the inner or tool-carrying spindle alone may be driven, the other rotatable spindles being entrained by the friction of the bearings.

The inventive ideas are capable of other mechanical expressions than that herein specifically illustrated and described.

I claim as my invention:—

1. A high speed spindle machine, comprising a tool-carrying spindle, a rotating bearing in which said spindle turns, and a direct-acting motor device for driving said spindle and bearing.

2. A high speed spindle machine, comprising a tool-carrying spindle, a rotating bearing in which said spindle turns, said spindle and bearing having turbine blades connected thereto.

3. A high speed spindle machine, comprising a tool-carrying spindle, a rotating bearing in which said spindle turns, and a compressed fluid motor for driving said spindle and bearing.

4. A high speed spindle machine, comprising a tool-carrying spindle, a rotating bearing in which said spindle turns, and a compressed fluid motor for driving said spindle and bearing, said motor comprising blades connected to said spindle and bearing.

5. A high speed spindle machine, comprising a tool-carrying spindle, a rotating bearing in which said spindle turns, a compressed fluid motor for driving said spindle and bearing, said motor comprising blades connected to said spindle and bearing, and a cap fitting over said blades having deflectors therein.

6. A high speed spindle machine, comprising a tool-carrying spindle, a rotating bearing in which said spindle turns, a compressed fluid motor for driving said spindle and bearing, said motor comprising blades connected to said spindle and bearing, and a cap fitting over said blades having deflectors therein and attached to the base of the machine.

7. A high speed spindle machine, comprising a tool-carrying spindle, a rotating bearing in which said spindle turns, a compressed fluid motor for driving said spindle and bearing, said motor comprising blades connected to said spindle and bearing, and a nozzle adapted to project the jet first against the blades connected to the spindle, the secondary power impingement of the jet being against the blades of the rotating bearing.

8. A high speed spindle machine, comprising a tool-carrying spindle, a rotating bearing in which said spindle turns, a compressed fluid motor for driving said spindle and bearing, said motor comprising blades connected to said spindle and bearing, and a nozzle adapted to project the jet first against the blades connected to the spindle, the arrangement of the blades on the bearing being such that the force of the jet thereon is only sufficient to overcome the resistance or friction of the bearing at the speed at which it is intended to rotate.

9. A high speed spindle machine comprising a driven tool-carrying spindle and a driven rotating hollow spindle in which said tool-carrying spindle has bearing.

10. A high speed spindle machine, comprising a driven tool-carrying spindle and a driven rotating hollow spindle in which said tool-carrying spindle has bearing, anti-friction balls between said tool-carrying spindle and hollow spindle, and anti-friction balls between said hollow spindle and its support, said tool-carrying spindle rotating at greater actual speed than said hollow spindle, the balls between the tool-carrying spindle and hollow spindle being at less radius from the center of rotation than the balls between the hollow spindle and its support.

11. A high-speed spindle machine, comprising a tool-carrying spindle, and one or more concentric hollow spindles, said spindles fitting one within another, the tool carrying spindle being innermost, anti-friction ball-bearings between said spindles, two or more sets of ball bearings being provided between two spindles, and means for driving said spindles, said innermost tool carrying spindle being driven with the highest speed.

12. A high-speed spindle machine, comprising a tool-carrying spindle, and one or more concentric hollow spindles, said spindles fitting one within another, the tool carrying spindle being innermost, anti-friction ball-bearings between said spindles, two or more sets of ball bearings being provided between two spindles, and means for driving said spindles, said innermost tool-carrying spindle being driven with the highest speed, the bearings between pairs of spindles being in different planes.

In witness whereof I have hereunto signed my name this 12th day of October 1917.

THEODORE H. DESSEZ.